US008285421B2

(12) United States Patent
Vander Griend

(10) Patent No.: US 8,285,421 B2
(45) Date of Patent: Oct. 9, 2012

(54) METHOD AND APPARATUS FOR OPTIMIZATION OF SPRINKLER HEAD POSITIONS AND NOZZLE SIZES IN AN IRRIGATION SYSTEM

(75) Inventor: Loren Vander Griend, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 565 days.

(21) Appl. No.: 12/569,582

(22) Filed: Sep. 29, 2009

(65) Prior Publication Data

US 2011/0077925 A1 Mar. 31, 2011

(51) Int. Cl.
*G05D 7/00* (2006.01)
*A01G 25/09* (2006.01)

(52) U.S. Cl. ............................. 700/284; 703/6
(58) Field of Classification Search .................. 700/284, 700/97; 703/6, 1, 9; 239/63, 69
See application file for complete search history.

(56) References Cited

U.S. PATENT DOCUMENTS

| | | | |
|---|---|---|---|
| 4,265,403 A | 5/1981 | Bonetti | |
| 4,852,802 A | 8/1989 | Iggulden et al. | |
| 5,621,669 A | 4/1997 | Bjornsson | |
| 5,884,224 A | 3/1999 | McNabb et al. | |
| 6,095,439 A | 8/2000 | Segal et al. | |
| 6,108,590 A | 8/2000 | Hergert | |
| 6,298,285 B1 | 10/2001 | Addink et al. | |
| 6,567,772 B1 | 5/2003 | Hoeft | |
| 6,662,144 B1 * | 12/2003 | Normann et al. | 703/1 |
| 6,892,114 B1 | 5/2005 | Addink et al. | |
| 7,063,270 B2 | 6/2006 | Bowers et al. | |
| 2007/0173981 A1 | 7/2007 | Vidovich | |
| 2010/0088077 A1 * | 4/2010 | Kisch et al. | 703/9 |
| 2010/0262305 A1 * | 10/2010 | Drechsel | 700/284 |

OTHER PUBLICATIONS

M.I. Valin et al., "Depivot, A Software Tool for Improved Water use With Center-Pivot Sprinkler Systems", Agricultural Engineering Research Center, Institute of Agronomy, Technical University of Lisbon, pp. 397-405, Feb. 2007.

(Continued)

*Primary Examiner* — Sean Shechtman
*Assistant Examiner* — Steven Garland
(74) *Attorney, Agent, or Firm* — Nixon & Vanderhye P.C.

(57) ABSTRACT

A method and apparatus provides optimized installation site specifications for sprinkler head position and nozzle size for center pivot and/or linear movement type irrigation systems in which a plurality of sprinkler heads are typically mounted at multiple adjacent lateral positions along a water supply boom/line. A sprinkler head spacing and nozzle size computational apparatus and method is disclosed which employs a sprinkler precipitation depth-profile based modeling technique for determining and optimizing lateral positions and nozzle sizes for sprinkler heads disposed along the length of an irrigation system supply distribution boom/line. A required/desired irrigation application delivery rate/depth is specified by an irrigation system user/designer for one or more discrete segments along the irrigation system distribution boom/line according to specific irrigation needs. An optimized nozzle size and position for each sprinkler head disposed along the boom/line is adaptively determined based on the specified required precipitation delivery depth and summations of individual predicted application depth profiles for an initial sprinkler and successively added sprinklers such that a computed delivery accumulation depth falls within a predefined range of error tolerance for the specified required delivery depth for that segment of the distribution line. An associated computer apparatus executing program instructions for implementing the method generates and displays a graphic indication of required and predicted precipitation depth profiles and computed optimized lateral positions and nozzle sizes for the irrigation system sprinklers.

18 Claims, 8 Drawing Sheets

Depth-Profile Based Sprinkler Spacing

OTHER PUBLICATIONS

G. D'Urso et al., "Remote Sensing and Simulation Modelling for On-Demand Irrigation Systems Management", http://www.fao.org/docrep/W4367E/w4367e0z.htm (10 pages), Aug. 2007.

Jess Stryker, "Sprinkler Spacing", Jess Stryker's Landscape Sprinkler Design Tutorial Step #3, 2003, http://www.irrigationtutorials.com/sprinkler15.htm (10 pages).

Jain Irrigation Systems Ltd., http://www.jains.com/Designtechnical/data.htm, (6 pales), Jul. 2007.

"Valley: Valley Water Application", Valmont Industries, Inc. Dec. 2007, www.valmont.com/irrigation (8 pages).

"Valley: Valley 7000 series", Valmont Industries, Inc. Mar. 2007 (3 pages).

Dale F. Heermann et al., "CPED: Center Pivot Evaluation and Design"—New version release, http://www.ars.usda.gov/Services/docs.htm?docid=8118 (3 pages).

Joe C. Oliphant, "Hyper-SPACE for WindowsTM", Center for Irrigation Technology Irrigation Notes, Oct. 1994, http://www.wateright.org/941003.asp (3 pages).

Joe C. Oliphant, "Modeling Sprinkler Coverage With the SPACE Program", Center for Irrigation Technology Irrigation Notes, May 1989, http://www.wateright.org/890802.asp (3 pages).

F.S. Zazueta et al., "Turf Irrigation With a Hose and Sprinkler", University of Florida IFAS Extension, Mar. 2000, http://edis.ifas.ufl.edu/WI015 (7 pages).

A.G. Smajstrla et al., "Field Evaluations of Irrigation Systems: Solid Set or Portable Sprinkler Systems", University of Florida IFAS Extension, May 1997, http://edis.ifas.ufl.edu/AE384 (12 pages).

"Strategies: Water/Site Specific Irrigation: Public Sector Activities", Precision Agriculture, http://nespal.cpes.peachnet.edu/pa/home/main.asp?TargetDir=20&content=1&media=, (4 pages), Aug. 2007.

\* cited by examiner

Conventional area-based Sprinkler Spacing

Depth-Profile Based Sprinkler Spacing

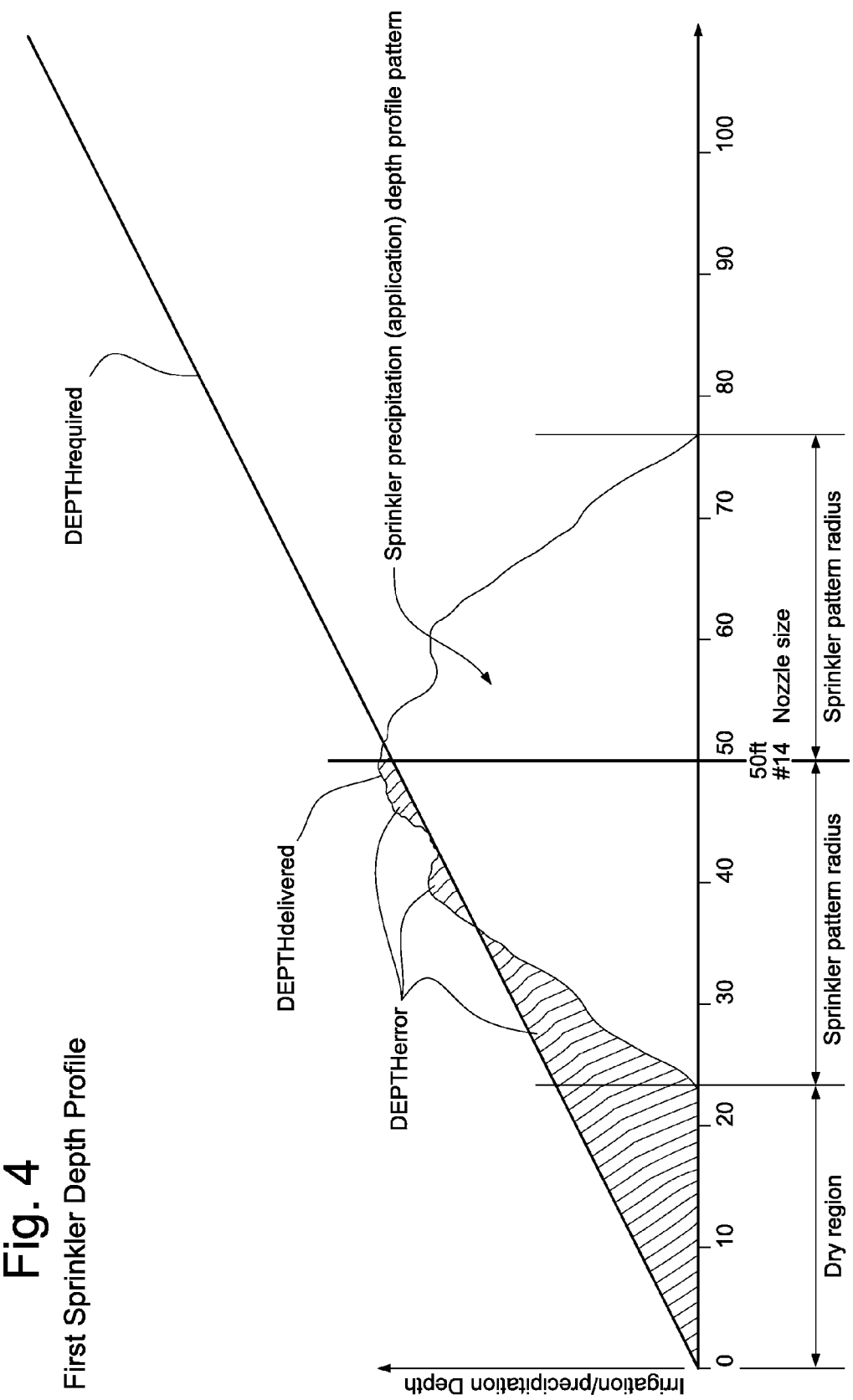

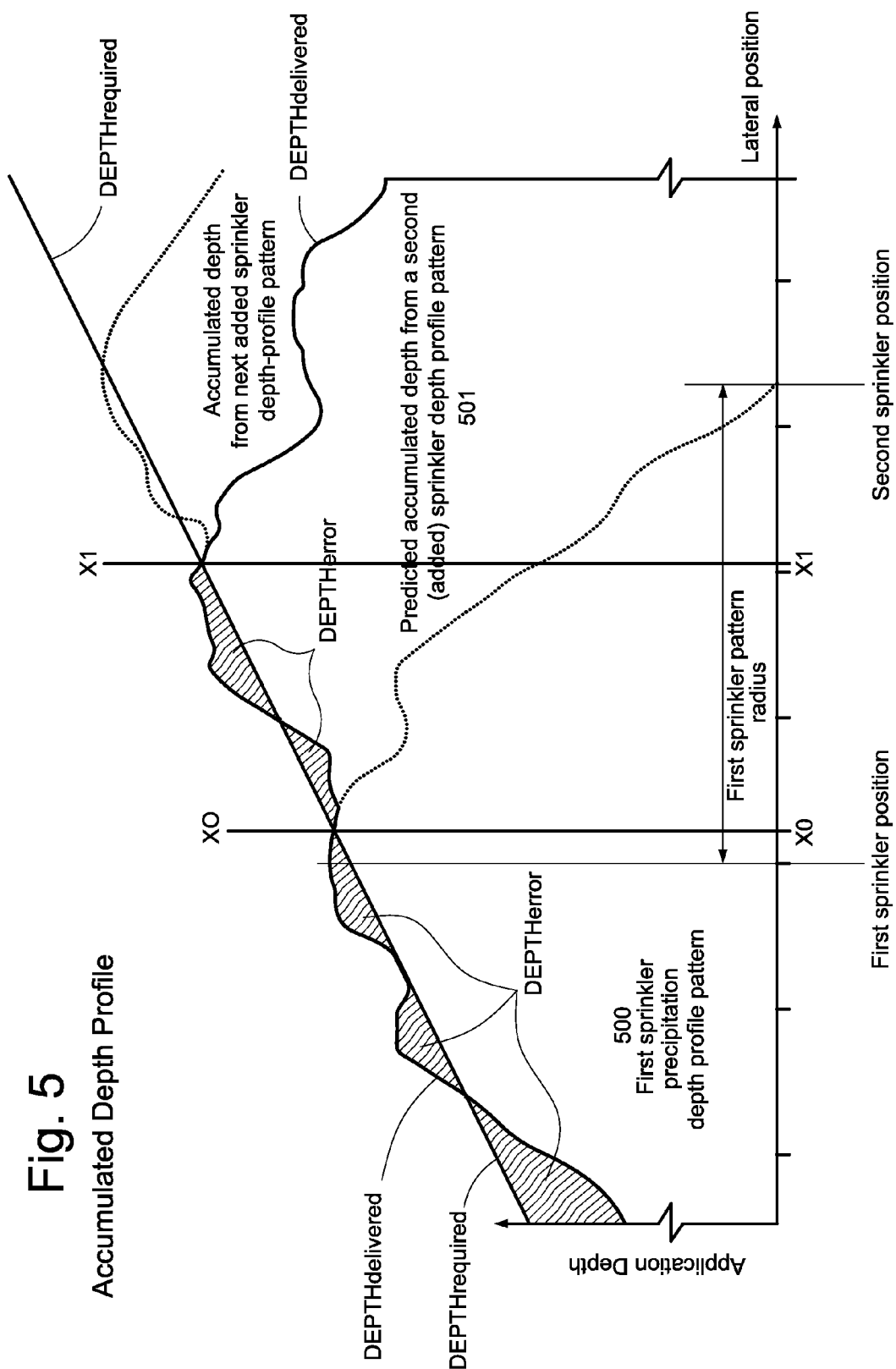

First Sprinkler Nozzle Size and Position Routine

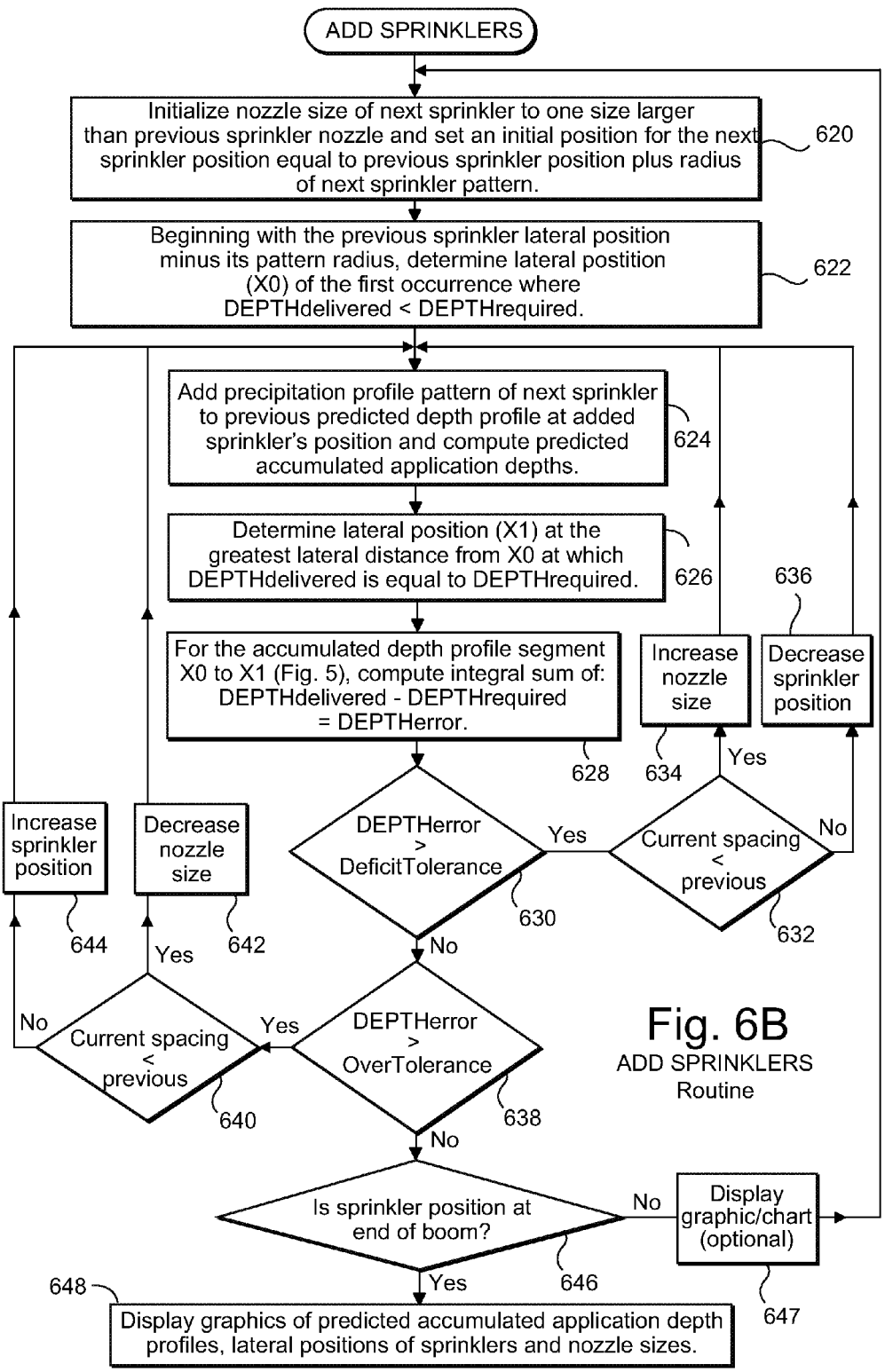

METHOD AND APPARATUS FOR OPTIMIZATION OF SPRINKLER HEAD POSITIONS AND NOZZLE SIZES IN AN IRRIGATION SYSTEM

TECHNICAL FIELD

The subject matter disclosed herein relates generally to computer assisted design of irrigation systems and more particularly to an automated method and apparatus for specifying and optimizing sprinkler head positions and nozzle size specifications for customized installations of center pivot and linear movement type irrigation systems.

BACKGROUND

In the designing of efficient and effective crop irrigation systems, it is highly desirable to have access to a suite of analytical tools which can assist the designer in the selection and placement of irrigation system components to customize and optimize the design of an irrigation system to suit varying irrigation requirements according to different crops and differing geophysical conditions.

For example, in an irrigation system having a basically linear water distribution boom line, such as used in center pivot and linear movement type irrigation systems, the flow requirements and nozzle sizes for each laterally adjacent sprinkler head are conventionally determined according to an irrigation area-based process that relies on the precipitation pattern coverage area associated with each individual sprinkler head and a set distance between laterally adjacent sprinkler heads. FIG. 1 shows a diagram illustrating this conventional "area-based" design technique. Using this technique, positions of each sprinkler head along the lateral extent of a linear boom line are first selected or set using a best estimate or most convenient fixed spacing between sprinkler heads. The flow rate and required nozzle size at each sprinkler head location are then determined based on the coverage pattern area for each particular sprinkler head and the "halfway" distance to a neighboring or laterally adjacent sprinkler.

It has been noticed that conventional "coverage area" based design computations for sprinkler and nozzle configuration in irrigation systems often prove to be somewhat inaccurate when compared with measured precipitation depths that were actually delivered by systems designed using this coverage area design approach. Consequently, there is a need for more precise methods and computational tools to aid sprinkler irrigation system designers and users in the setup and configuration of customized irrigation systems which can be optimized for each particular application and location. There is also a need to provide sprinkler irrigation system designers and users with advanced and automated design tools which can accurately model and predict resultant irrigation depths prior to installation and operation of components in the field. In particular, there is a need for improved analytical techniques and automated design tools for optimizing sprinkler head positions and nozzle size specifications for customized installations of center pivot and linear movement type irrigation systems. Accordingly, disclosed herein is a nonlimiting illustrative example implementation of an apparatus and adaptive method for designing, modeling and evaluating sprinkler head configurations in various irrigation systems and, in particular, for providing improved design and modeling of center pivot and linear movement type irrigation systems.

SUMMARY OF A NONLIMITING ILLUSTRATIVE EXAMPLE IMPLEMENTATION OF THE INVENTION

In a nonlimiting illustrative example implementation of the presently disclosed adaptive method and computerized apparatus for designing irrigation systems, the lateral positions of a plurality of sprinkler heads along an irrigation distribution line are determined in accordance with a novel application depth-profile based sprinkler spacing technique that takes into account the total accumulated precipitation depths contributed by neighboring sprinkler heads over a particular irrigated area. As opposed to the more conventional design approach wherein sprinkler positions and spacings are set at pre-selected or evenly spaced separations along a distribution line and corresponding flow rates are determined based on each individual sprinkler precipitation pattern radius/area, an improved design technique as disclosed herein is employed in wherein sprinkler positions are determined based upon known or predetermined application depth profile patterns associated with types of sprinkler heads and nozzle sizes and upon a predicted accumulated precipitation depth computed across discrete segments along the length of the distribution boom/line.

More specifically, in accordance with known precipitation/application depth profiler for different sprinklers and nozzle sizes and the pre-specified irrigation delivery rate/depth requirement over a particular irrigation area, a predicted total precipitation accumulated delivered depth profile is computed across discrete segments along an irrigation system distribution boom/line supplying the irrigated area. First, a required depth is plotted across the lateral extent of the boom line, then positions and nozzle sizes for laterally adjacent sprinkler heads are successively determined. Each successive position and nozzle size for a plurality of sprinkler heads being determined by iteratively selecting nozzle sizes and lateral positions along the distribution line and optimizing the selected lateral positions and sizes by calculating the sum of individual application depth profiles for an initial sprinkler and each successively added sprinkler to provide a predicted total accumulated application delivery depth for each segment of the distribution line, and then selecting only the added sprinkler positions that result in a predicted total accumulated application delivery depth that most closely matches the required irrigation depth for each corresponding segment of the distribution line.

Another aspect of the nonlimiting illustrative example implementation disclosed herein includes a computer system, device or network server implemented method and computer program product containing computer instruction code for configuring a computer system, device or network server to implement a method for computing and specifying optimized lateral sprinkler positions and nozzle sizes along a distribution boom in center pivot and linear move type irrigation systems.

An example computer system for use in implementing the method and apparatus disclosed herein may comprise various hardware and software components such as a multitasking operating system, data storage devices, a display device, a user interface device such as a keyboard and/or other input devices connected to a CPU, personal computer or computer network operating in conjunction with other useful and/or unrelated interface hardware and application software. For example, a multitasking operating system program such as, but not limited to Microsoft® Windows® or IBM OS/2®, may be executed on the CPU to manage primary operations. The computer or CPU may also be linked to various remote databases and/or servers via private communications lines or the Internet. Alternatively, the methods disclosed herein may be expressed in a software application used on a mobile computing device or as part of a software suite of applications used in a computer network or Internet accessible server.

BRIEF DESCRIPTION OF THE DRAWINGS

The block and flow diagrams in the figures below do not necessarily represent an actual physical arrangement of the example system, but are primarily intended to illustrate major structural components in convenient functional groupings so that the nonlimiting illustrative exemplary implementation presented herein may be more readily understood.

FIG. 4 is a graph illustrating an example irrigation depth profile pattern for a single sprinkler head;

FIG. 5 is a graph illustrating an example irrigation depth profile pattern for two sprinkler heads;

FIG. 6B is a computer program process flow diagram illustrating a nonlimiting example routine for optimizing sprinkler position and nozzle size for second and additional sprinkler heads.

DETAILED DESCRIPTION OF AN ILLUSTRATIVE IMPLEMENTATION

A nonlimiting illustrative example implementation of an apparatus and method for designing irrigation systems is disclosed wherein sprinkler head nozzle sizes and positions along a linear distribution boom line are successively determined along the line using an irrigation depth-profile based technique. Initially, an irrigation application rate/depth is determined or specified for discrete segments along a linear extent of a distribution boom line in an irrigation system. Positions for laterally adjacent sprinkler heads are then successively determined at sequentially computed locations along the distribution line in such a manner that a predicted delivered application depth for each linear segment along the distribution line will closely match the particular application depth required beneath each segment of the line, the predicted delivered application depth being computed by summing individual application depth profiles for each successively added sprinkler head.

An exemplary computer system/device for use in the design of sprinkler irrigation systems may consist of a display device and a keyboard-type input operatively connected or integral to a mobile computer device, personal computer or network server. The example computer system/device may also be operatively coupled to various I/O devices such as a bar code scanner, an RFID receiver, a plotter, a printer and one or more data storage and retrieval devices. For simplicity of description, a nonlimiting illustrative example of a basic computer hardware environment for implementing the disclosed automated method and apparatus for specifying and optimizing sprinkler head positions and nozzle sizes in a sprinkler irrigation system design.

In this example, specifications for various design elements for the proposed irrigation system are first entered and maintained in a database and/or data storage units associated with the computing system implementing the method. Specific design elements may include field location information and component specifications including fluid flow capacities/requirements regarding, for example, a variety of different sprinkler heads, nozzles, distribution line piping and connection equipment, etc.

Preferably, an irrigation system customer or system designer/engineer enters information regarding the geographic location specific and irrigation requirements of an area to be irrigated into the computer database. The entry of such information may be readily accomplished through any number of conventional methods including direct entry via keyboard input device or remote entry from a PC or smart mobile device via the Internet or other wired or wireless connections.

Figure 2A:
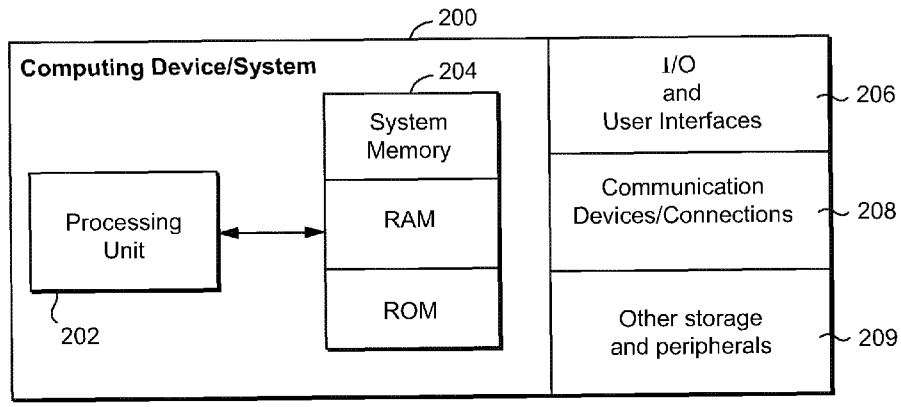
FIG. 2A is a nonlimiting illustrative example computing environment hardware diagram of a device/system on which the disclosed computerized method for designing and optimizing an irrigation system may be implemented.
Figure 2B:
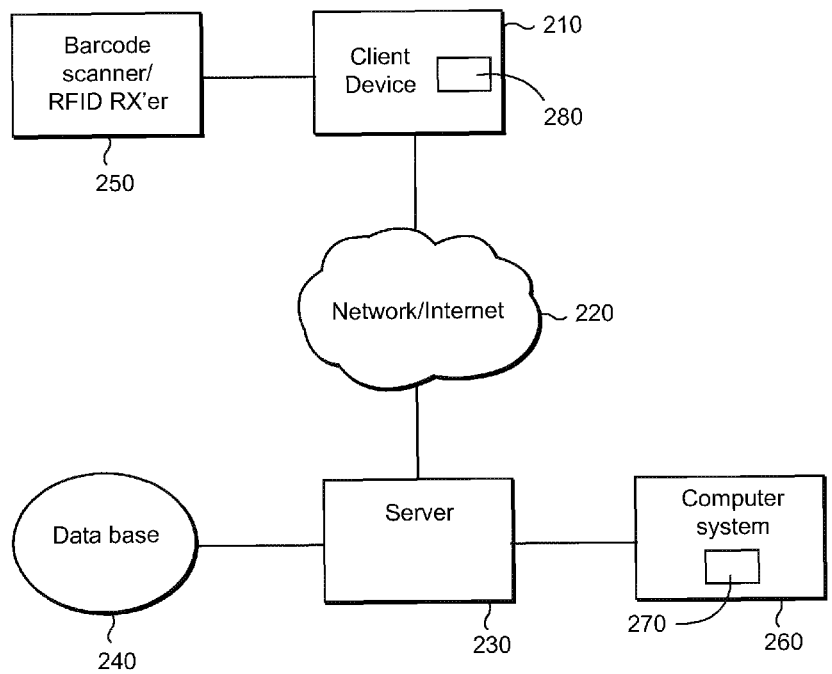
FIG. 2B illustrates an exemplary computer network system on which the disclosed computerized method for designing and optimizing an irrigation system may be implemented.

FIGS. 2A and 2B illustrate example computing environments in which the disclosed computerized method for designing and modeling an irrigation system may be implemented. FIG. 2A is a basic hardware diagram of one nonlimiting illustrative example of a computerized device/system for implementing the disclosed method and apparatus. FIG. 2B is a diagram of an example network computing environment in which the disclosed computerized method and apparatus may be implemented.

Referring first to FIG. 2A, one nonlimiting illustrative example is provided for a computing system hardware environment 200 by which an automated computerized system/device for designing and optimizing an irrigation system may be realized. Although computing system environment 200, as illustrated, provides only one basic example of a suitable computing environment/device, one skilled in the art would appreciate that other environments, systems, and devices may be also used to implement the example system disclosed herein.

In this example, the hardware environment 200 consists of a computing device/system that includes a CPU or processing unit 202, a data storage memory 204 comprising one or more volatile and/or nonvolatile memory portions, an I/O and user interface 206 including devices such as a conventional display device and keyboard (not shown), a communications portion 208 including conventional connections/devices that enable the computing system device/system to communicate with other computer networks and peripheral devices 209 such as a printer and external storage devices. The I/O and user interface 206 may also include input devices such as a mouse, pen, voice-input device, touch-input device, etc., and output devices such as a display, speakers, printer, etc. The communications connection/device 208 is also representative of data communication media sources which may embody computer-readable instructions, data structures, program modules or other data in a modulated signal such as a carrier wave or other transport mechanism and includes any information delivery media. The term "modulated data signal" means a signal that has one or more of its characteristics set or changed in such a manner as to encode information in the signal. By way of example, communication media sources include wired media such as a wired network or direct-wired connection, and wireless media such as acoustic, radio-frequency (RF), infrared and other wireless media. The term computer-readable media as used herein includes both storage media and communication media.

As shown in FIG. 2B, an example implementation may also take the form of a networked computer system/device including, for example, a computerized electronic client device 210, such as a smart phone, PDA, laptop or mobile personal computer workstation, is linked via a communications network 220 (e.g., the Internet) to a remote network computer or server 230. The server 230 may further be coupled, or otherwise have access, to an information database 240 and/or a computer system 260. Although the example implementation illustrated in FIG. 2B shows only one server 230 coupled to one client device 210 via a single communications network 220, it should be recognized that other hardware configurations are contemplated using one or more such client devices coupled to one or more such servers.

The client device 210 and the server 230 may include all or fewer than all of the features associated with the computing device/system 200 illustrated in and discussed with reference to FIG. 2A. Preferably, client device 210 includes or is otherwise coupled to a keyboard input device and display screen/device 280 and executes the example automated irrigation system design tool program implementation disclosed herein. A user of client device 210 may employ a conventional browser application running on the client device to access a web site providing access to database 240 and/or to an automated irrigation design tool program implementation running on server 230. Preferably, client device 210 also includes or is otherwise coupled to a barcode scanner or a radio frequency ID (RFID) receiver device 250. Client device 210 may also be used for various other purposes such as performing network and local-computing processes.

In this example, client device 210 is linked via the network 220 to server 230 so that computer programs, such as, for example, a browser, running on the client device 210 can cooperate in two-way communication with server 230. The server 230 may be coupled to database 240 to retrieve information therefrom and to store information thereto. Database 240 may include, for example, environmental conditions data, geographic map data and component specifications data that can be used by the server 230 and/or client device 210 to enable performance of various aspects of irrigation system design and optimization. Server 230 may be coupled to one or more other computer system 260 in a manner allowing the server to delegate certain processing functions or to enable another computer system 260 to access database 240 and/or programs provided by server 230. Additionally, computer system 260 may include user interfacing devices 270 such as keyboard input device and display screen/device 270 and be capable of executing the example automated irrigation system design tool program implementation disclosed herein.

Still referring to FIG. 2B, a user of the client device 210 may desire to use a browser application running on the client device to access web content, which may, but need not, be served by the server 230. Specifically, by employing an appropriate uniform resource locator (URL) in a known manner, the user may run or download from the server 230 and install on the client device 210 a software program/module comprising computer-executable instructions as described more fully hereinafter to implement the example automated irrigation system design optimization method disclosed herein. Alternatively, the user may obtain such irrigation system design optimization software program/module on a tangible computer-readable medium (not shown), such as, for example, a CD-ROM, and subsequently install and execute the disclosed design optimization method on client device 210 directly from the medium.

Figure 1:
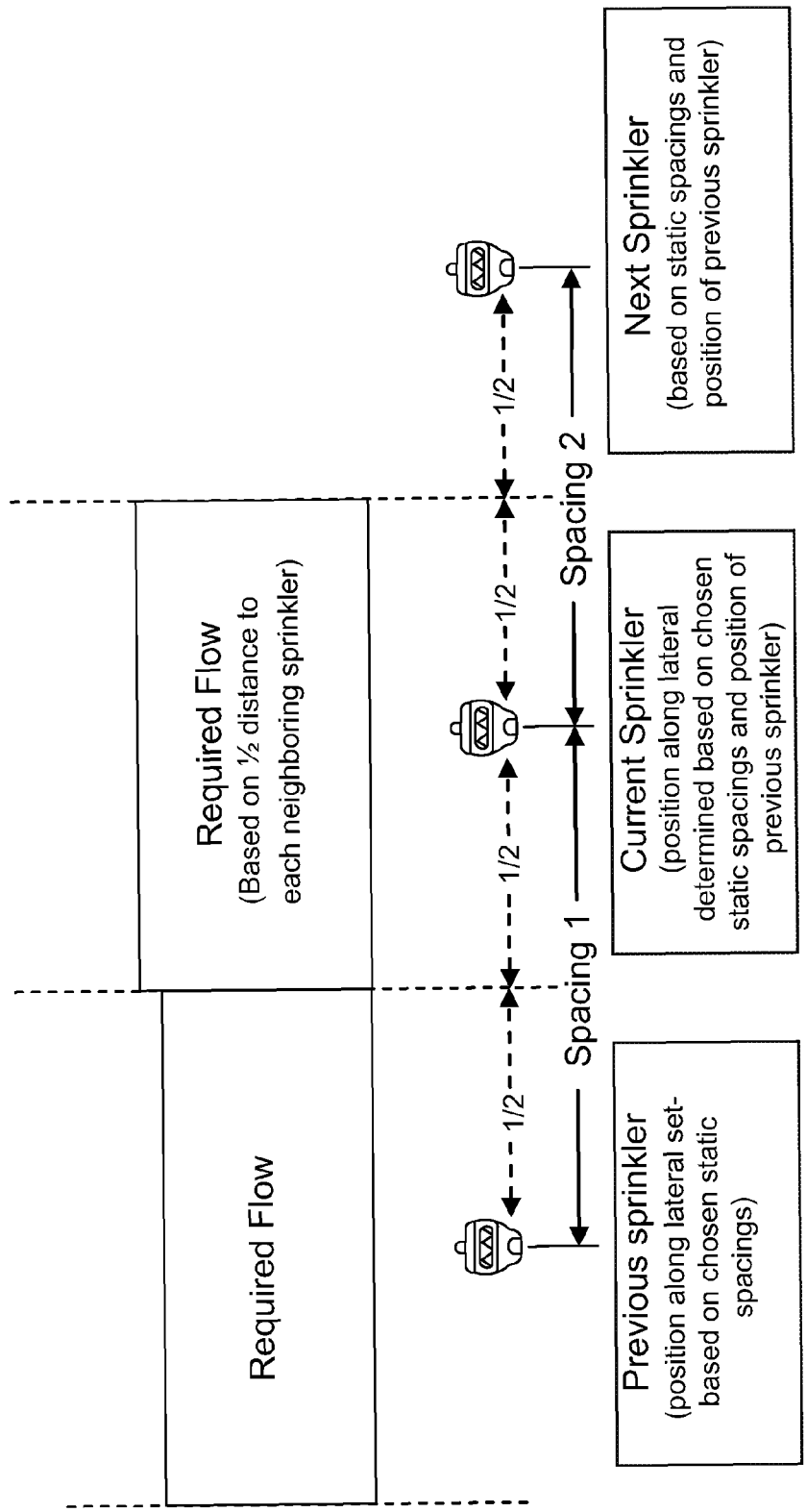
FIG. 1 is a diagrammatic illustration of an irrigation system design approach using a conventional area-based sprinkler head spacing arrangement.
Figure 3:
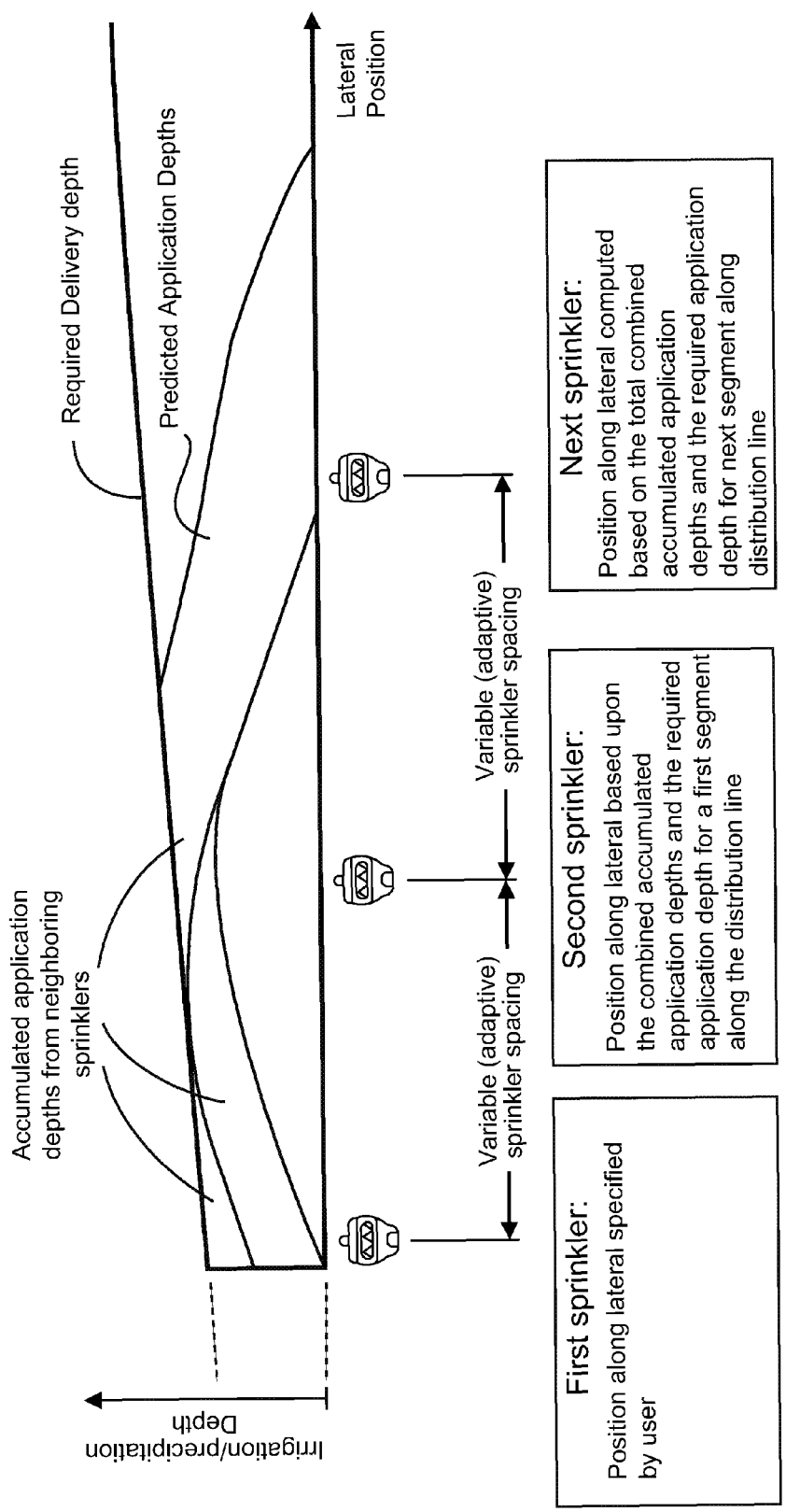
FIG. 3 is a diagrammatic illustration of a sprinkler head depth-profile analysis technique for optimizing an irrigation system design.

FIG. 3 provides a general diagrammatic illustration of a novel technique for designing sprinkler type irrigation systems which, as opposed to the conventional area-based spacing approach of FIG. 1, determines sprinkler head spacings and sprinkler nozzle sizes or flow rates by using a sprinkler head application depth-profile based analysis. Basically, in contrast to the known conventional design approach wherein specific sprinkler positions/spacings are fixedly set or pre-designated in accordance with keen judgment, a novel depth-profile based design technique is disclosed herein in which sprinkler positions are variable and are adaptively determined based on computed predictions for delivered irrigation depths iteratively calculated over discrete segments of the distribution boom/line.

Using this novel approach, a desired or required irrigation application delivery rate/depth is first specified by a user/designer for contiguous segments along the distribution boom line or at least for a plurality of points representing a contiguous segment of the line. Next, as illustrated in FIG. 3, a nozzle size and position for each sprinkler head along the line is determined based on individual sprinkler head dispersion characteristics and a resulting sum of individual application depth profiles for an initial sprinkler and each successively added sprinkler in a manner so as to result in delivering the required precipitation accumulation delivery depth over each particular segment along the boom line. More specifically, each successive lateral position and nozzle size for a plurality of sprinkler heads are adaptively determined by iteratively computing optimized locations along the distribution line by calculating the sum of individual application depth profiles for an initial sprinkler and each successively added sprinkler to provide a predicted total accumulated application delivery depth and then selecting only the added sprinkler positions that result in a predicted total accumulated application delivery depth that most closely matches the required irrigation application depth for each segment of the distribution line.

For example, in a central pivot distribution (CPD) irrigation system, the lateral position of the first sprinkler along a radial distribution boom/line is specified by the user/designer to be set at a distance from the control pivot equal to the radius of the sprinkler head precipitation pattern plus the radius of any dry region derived at the center of the irrigation circle. The lateral spacing between each sprinkler added after the first is variable and is adapted, along with the nozzle size, to produce an optimal match between a predicted accumulated application depth as produced by the total of all contributions from each of the previous neighboring sprinklers and the required delivery depth over the length of the boom line.

FIG. 4 shows a graph illustrating an example sprinkler precipitation (application) depth profile pattern for a single sprinkler head located at a first lateral position along a distribution boom line. In this example, a first sprinkler position at 50 ft was chosen using a sprinkler head having a precipitation pattern radius of about 26 ft so as to leave a dry (non-irrigated) region of about 23 ft from the beginning of the line. As seen in FIG. 4, using a #14 nozzle size located at a 50 ft lateral position results in a precipitation (application) depth profile which exceeds the required application depth in some places and is less than the required application depth in others. These regions of the depth profile pattern are indicated by hash marks as DEPTHerror regions. The sprinkler nozzle size and resultant prescription depth profile pattern are selected so as to attempt to minimize the total depth error over the sprinkler pattern radius region between the sprinkler position and the initial dry region.

Referring to FIG. 5, a diagrammatic graph is provided to illustrate the accumulated irrigation depth profile pattern which results when an application depth profile for a second sprinkler head is added to the application depth profile of a first sprinkler head. As in FIG. 4, a sprinkler precipitation depth profile (500) for a first sprinkler head is shown as a plot of predicted application depth versus lateral position. If, for example, a second sprinkler head is positioned at a lateral location equal to the first sprinkler position plus the radius of its own precipitation pattern (second sprinkler position not shown), then a total predicted accumulated precipitation depth 501 due to both sprinklers is the sum of each sprinkler's individual depth profile pattern across the lateral extent of the distribution line covered by each sprinkler. This predicted accumulated precipitation depth profile 501 provides a cumulative plot (DEPTHdelivered) of the total predicted precipitation depth delivered versus lateral position along the distribution boom line. FIG. 5 also shows an example user-specified required precipitation depth (DEPTHrequired) plotted versus lateral position. Regions in the graph where the plot of DEPTHdelivered is greater or less than the plot of DEPTHrequired are shown as DEPTHerror regions and are indicative of an amount of predicted irrigation deficiency or overabundance which may occur at corresponding lateral positions along the boom line. The vertical line X0 marks a lateral position where the plot of DEPTHdelivered first drops below the plot of DEPTHrequired (after initially rising above DEPTHrequired). The vertical line X1 marks a lateral position at the greatest lateral distance from X0 at which the plot of DEPTHdelivered is found to be equal to DEPTHrequired.

Figure 6A:
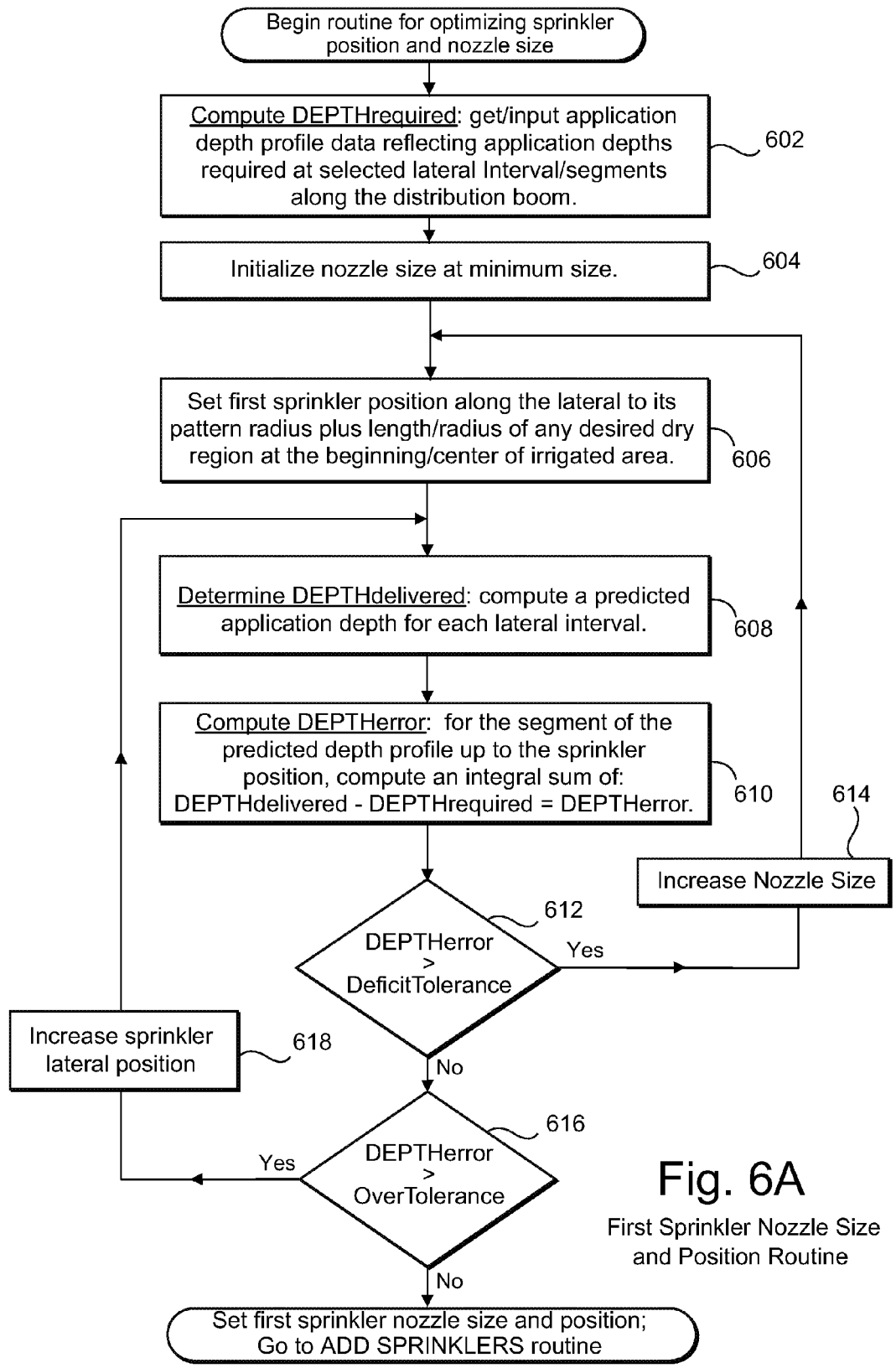
FIG. 6A is a computer program process flow diagram illustrating a nonlimiting example routine for optimizing a first sprinkler position and nozzle size.

Referring now to FIGS. 6A and 6B, a generalized computer program process flow diagram is shown which illustrates blocks of a nonlimiting example computer program routine for implementing the improved irrigation system design technique and method disclosed above. One of ordinary skill in the art would realize that a variety of computer program instructions and program routine steps may be employed to achieve the desired function and results as the exemplary computer program process described herein, and that an implementation of the computer program routine and process blocks described below is not intended as being limited to the specific example of FIGS. 6A and 6B. In addition, although the nonlimiting example routine described below is of particular use in optimizing the design and specifications of sprinkler spacings and nozzle sizes for central pivot and linear movement crop irrigation systems, one of ordinary skill would appreciate that it could be readily modified without undue experimentation to the designing and optimization of other types of irrigation systems.

Referring first to FIG. 6A, in block 602 (Compute DEPTHrequired), a computing device processing unit acquires data specifying the application depth required all along a desired length of the irrigation distribution boom/line from the local system/device memory or from a remote database. In block 604, a nozzle size selection parameter for the first sprinkler to be used along the line is initialized at a minimum size. In block 606, an initial location of the first sprinkler from the supply source along a lateral extent of the line is set in accordance with its associated precipitation pattern radius plus the length/radius of any desired dry region at the origin of the irrigation boom line. In block 608 (Determine DEPTHdelivered), a predicted application delivery depth is computed for the first sprinkler along the line based on an application depth-profile associated with the first sprinkler. The predicted application delivery depth for a particular sprinkler will depend upon the sprinkler type and nozzle size (flow rate) used with that sprinkler.

Next, in block 610, a predicted delivered depth error value is computed (Compute DEPTHerror) to determine an amount that the predicted delivery depth for the first sprinkler deviates from a required delivery depth over a first portion/segment of the boom line. Initially, this depth error is computed over a first segment of the boom line starting from the irrigation supply source at one end up to the position of the first sprinkler. The depth error (DEPTHerror) over this segment is computed as the sum of the predicted delivered irrigation depth (DEPTHdelivered) minus the irrigation depth required over the segment (DEPTHdelivered−DEPTHrequired=DEPTHerror).

Next, as indicated in diamonds 612 and 616, the depth error value is then compared against predetermined deficit and over-depth tolerance values. If the predicted delivered depth error is greater than a predetermined under-depth (deficit) tolerance, then a next larger nozzle size is selected for the sprinkler and the operations in blocks 606 through 610 are again performed to determine a new initial position and compute new values for DEPTHdelivered and DEPTHerror. Alternatively, if the predicted delivered depth error is greater than an over-depth tolerance value, then the lateral position of the sprinkler along the line from the beginning or supply source end is increased by a predetermined increment and the operations in blocks 608 through 610 are again performed to compute new values for DEPTHdelivered and DEPTHerror. In this manner, an initial position and nozzle size (or flow rate) for the first sprinkler are adaptively determined by iteratively adjusting position and nozzle size until the predicted delivered application depth falls within predetermined tolerances of the required delivery depth over that initial segment of the distribution line from the irrigation supply source to the position of the first sprinkler. Once a predicted delivered depth error is determined to be within both of these tolerance ranges, then the lateral position and nozzle size for the first sprinkler are set and the program process proceeds to the ADD SPRINKLERS routine illustrated in FIG. 6B for adaptively determining successive additional sprinkler positions and nozzle sizes laterally along the boom line until the end of the line is reached.

Referring now to FIG. 6B, in block 620, a nozzle size for the next successively added sprinkler is initialized to one size larger than the first (or previous) sprinkler nozzle size and a position for the added sprinkler is initialized at lateral position equal to the lateral position of the previous sprinkler plus the radius of the added sprinkler pattern. Next, in block 622, a lateral position X0 (FIG. 5) at the first occurrence where DEPTHdelivered becomes less than DEPTHrequired is determined by comparing DEPTHdelivered with DEPTHrequired over a segment beginning with the lateral position of the previous sprinkler minus its pattern radius (ignoring that portion of the first sprinkler depth-profile where the DEPTHerror is initially less than DEPTHdelivered).

In block 624, the individual depth-profile of the added sprinkler is added to the previously existing predicted accumulated depth-profile at the added sprinkler position and an updated predicted accumulated application depth-profile is determined. Next, in block 626, a lateral position X1 (FIG. 5) is found for DEPTHdelivered along the updated predicted accumulated application depth-profile for the greatest lateral distance from X0 (where DEPTHdelivered was determined to be equal to DEPTHrequired). Then, in block 628, the sum of a predicted delivered irrigation depth (DEPTHdelivered) minus the irrigation depth required over the segment of the updated predicted accumulated application depth-profile from X0 to X1 is computed to determine a depth error value (DEPTHdelivered−DEPTHrequired=DEPTHerror) corresponding to that segment.

Next, as indicated in diamonds 630 and 638, this computed depth error value for the segment of the accumulated application depth-profile from X0 to X1 is again compared against predetermined deficit and over-depth tolerance values. If at diamond 630 the predicted delivered depth error (DEPTHerror) is determined to be greater than a predetermined under-depth (deficit) tolerance, then at diamond 632 the current lateral sprinkler spacing between the previous sprinkler and the added sprinkler is compared with the prior sprinkler spacing used between the previous sprinkler and its preceding sprinkler (if any), and if the current spacing is less than the prior spacing then a next larger nozzle size is selected for the sprinkler (block 634), and if the current spacing is not less than the prior spacing then the current sprinkler spacing is decreased by a predetermined increment (block 636), then the operations in blocks 624 and 626 are again performed to compute an updated accumulated depth-profile and new values for DEPTHdelivered and DEPTHerror.

At diamond 638, if the predicted delivered depth error (DEPTHerror) is determined to be greater than a predetermined over-depth tolerance, then at diamond 640 the current lateral sprinkler spacing is compared with the prior sprinkler spacing and if the current spacing is less than the prior spacing then a next smaller nozzle size is selected for the sprinkler (block 642), and if the current spacing is not less than the prior spacing then the current sprinkler spacing is increased by a predetermined increment (block 644), and then the operations in blocks 624 and 626 are again performed to compute an updated accumulated depth-profile and new values for DEPTHdelivered and DEPTHerror. In this manner, a lateral position and nozzle size (or flow rate) for each added sprinkler are adaptively determined by iteratively adjusting the lateral position and nozzle size until the predicted delivered application depth falls within predetermined tolerances of the required delivery depth over a corresponding lateral segment of the distribution line from the X0 position in the application depth-profile to the X1 position.

Next, at diamond 646, it is determined if a next added sprinkler position is beyond the end of the boom line. If the end of the boom line has not been reached, then the described adaptive reiterative process for determining a nozzle size and lateral position for the next sprinkler to be added starts again at block 620. If a next added sprinkler position would be beyond the end of the boom line, then the ADD SPRINKLERS process is finished and terminates.

At blocks 647 and 648, a graph or image is generated and output to a display device that provides a user with a graphic illustration of the predicted accumulated application depth profile for successive sprinklers including lateral positions and nozzle sizes for each sprinkler either as each sprinkler is added (647) and/or upon computing the last sprinkler position along the boom line (648).

Figure 7:
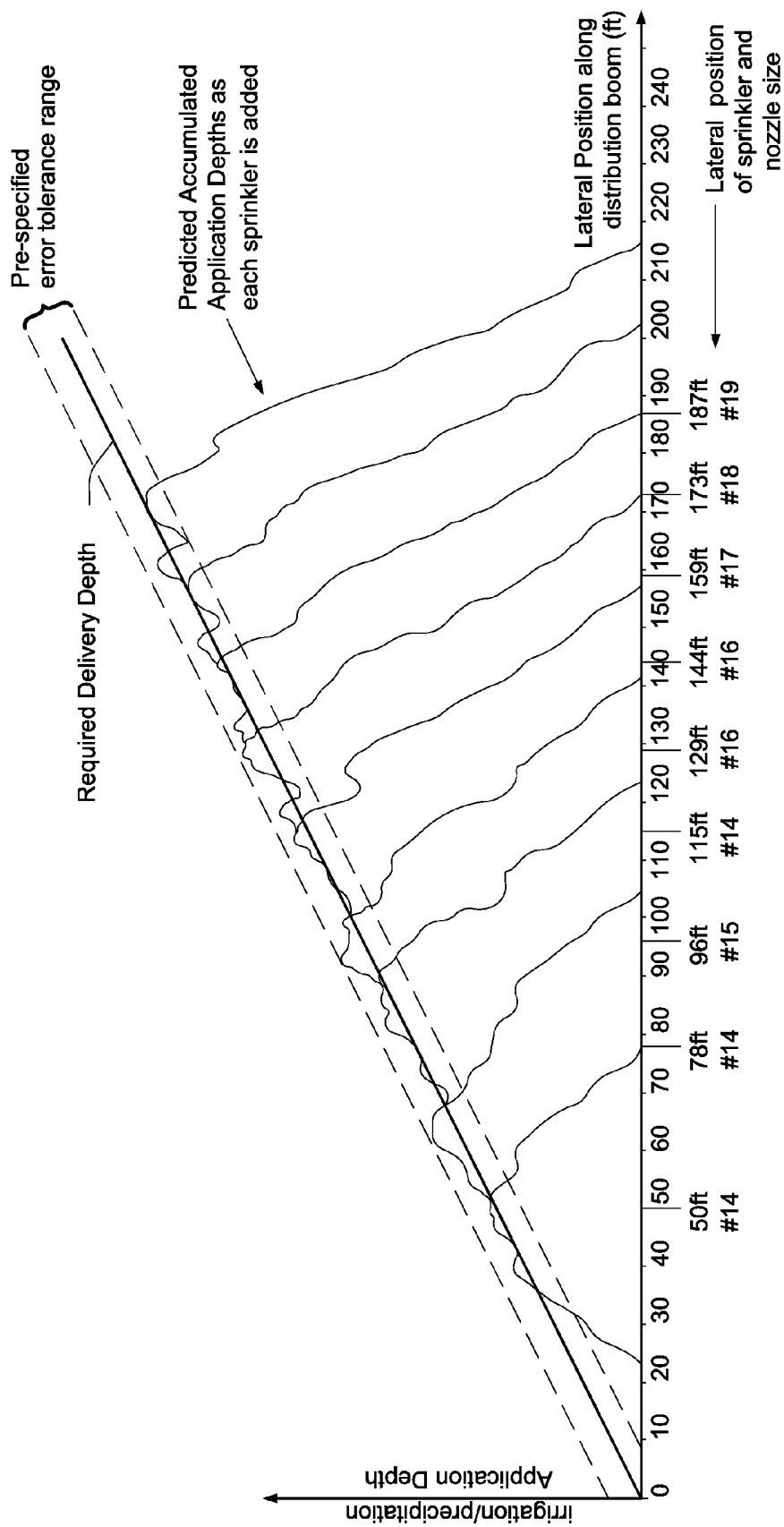
FIG. 7 is an example output graphic illustrating a predicted accumulated precipitation depth-profile for a plurality of sprinkler heads positioned along an irrigation distribution boom.

For example, FIG. 7 shows an example display output graphic illustrating predicted accumulated application depths computed using individual application depth profiles for a plurality of sprinkler heads whose nozzle sizes and positions along an irrigation distribution boom line were optimized in accordance with the above-described iterative method. In this example display output, individual predicted accumulated precipitation application depths are plotted against lateral position along an irrigation boom/distribution line for nine successively added sprinkler heads where lateral positions and nozzle sizes for each successive sprinkler head was optimized by iteratively calculating a predicted delivered accumulated application depth (DEPTHdelivered) that falls within predetermined error tolerances of the user/designer specified required delivery depth (DEPTHrequired). The dotted lines just above and below the solid line in FIG. 7 indicating the required delivery depth represent user/designer specified upper and lower tolerance limits for exceeding or under achieving the required irrigation delivery depths along the boom line.

As described above, an implementation of the method and apparatus disclosed herein may be in the form of computer-implemented processes and apparatuses for practicing those processes. An implementation may also be practiced or embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the disclosed process or method. An implementation may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and/or executed by a computer, the computer becomes an apparatus for practicing the disclosed process or method. When implemented on a general-purpose programmable microprocessor or computer, the computer program code configures the programmable microprocessor or computer to create specific logic circuits (i.e., programmed logic circuitry).

While disclosed method and apparatus is described with reference to one or more exemplary embodiments, it will be understood by those skilled in the art that various changes may be made and equivalence may be substituted for elements thereof without departing from the scope of the claims. In addition, many modifications may be made to the teachings herein to adapt to a particular situation without departing from the scope thereof. Therefore, it is intended that the claims not be limited to the specific embodiments disclosed, but rather include all embodiments falling within the scope of the intended claims. Moreover, the use of the terms first, second, etc. does not denote any order of importance, but rather such terms are used solely to distinguish one claim element from another.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of optimizing sprinkler nozzle size and lateral position for a plurality of sprinkler heads to be positioned along an irrigation system distribution boom/line, the irrigation system conforming to a specified required precipitation delivery rate/depth associated with one or more discrete segments of the distribution boom/line, comprising:

computing an accumulated precipitation delivery depth produced by one or more sprinklers provisionally added and positioned along a segment of an irrigation system distribution boom/line based upon a summation of individual sprinkler precipitation depth profiles, each sprinkler precipitation depth profile associated with a particular sprinkler type and nozzle size, wherein the accumulated precipitation delivery depth is determined in an iterative manner in which sprinkler nozzle size and lateral position parameters for each said provisionally added and positioned sprinkler are varied during successive iterations until a computed accumulated precipitation delivery depth across the segment falls within a predetermined range of error tolerance of a required precipitation delivery rate/depth along the same segment; and outputting information indicative of respective optimized lateral position and nozzle size parameters of each sprinkler along a segment of the irrigation system distribution boom/line, as determined by said iterative computing, which results in the computed accumulated precipitation delivery depth being within the predetermined range of error tolerance over the length of each segment.

2. A computer-implemented method of optimizing sprinkler nozzle size and lateral position for a plurality of sprinklers along one or more segments of an irrigation system distribution boom/line, comprising:

storing required precipitation delivery rate/depth information corresponding to one or more discrete segments along the irrigation system distribution boom/line, said required precipitation delivery rate/depth information including an associated range of rate/depth error tolerance for a segment;

storing a plurality of sprinkler precipitation application depth profiles for specifying individual precipitation coverage patterns associated with a plurality of different sprinkler head/nozzle designs and sizes;

iteratively computing a delivered precipitation depth profile and a delivered precipitation depth error along a first lateral portion of a distribution boom/line segment and an optimized sprinkler nozzle size for a first sprinkler located at a user-selected first lateral position based on said required precipitation delivery rate/depth information, said sprinkler precipitation application depth profiles and a computed delivered precipitation depth error for said first sprinkler, wherein a sprinkler nozzle size parameter is varied during successive iterations until the computed delivered precipitation depth error is within a predetermined range of error tolerance associated with a required precipitation delivery rate/depth for said first lateral portion of the distribution boom/line segment;

iteratively computing a total accumulated delivered precipitation depth profile and a total accumulated precipitation depth error for said first and a second portion of the distribution boom/line segment and an optimized sprinkler nozzle size and lateral position for at least a second or more sprinklers added at adjacent lateral positions along said distribution boom/line based upon a computed summation of said first sprinkler delivered precipitation depth profile with one or more sprinkler delivered precipitation depth profiles corresponding to said second or more subsequently added sprinklers, wherein parameters for sprinkler nozzle size and lateral position for each of said second or more subsequently added sprinklers are varied during successive iterations until the computed total accumulated precipitation depth error is within a predetermined range of error tolerance associated with a required precipitation delivery rate/depth for said first and second portions of the distribution boom/line segment; and outputting information specifying said optimized nozzle size and lateral position for each sprinkler along a segment of the distribution boom/line.

3. The computer-implemented method of claim 2 wherein a computed delivered depth error is determined by computing a sum of delivered precipitation depth over a segment minus the required delivery depth over the sam segment.

4. The computer-implemented method of claim 2 wherein a stored application depth profile specifies at least a delivery precipitation depth per unit distance along a diameter of a precipitation coverage pattern associated with a particular sprinkler and nozzle size.

5. A precipitation depth-profile based method for adaptive determination of sprinkler spacing and sprinkler nozzle size in center pivot and/or linear moving irrigation system, the method comprising:

specifying sprinkler application depth profiles for a plurality of differing sprinkler head/nozzle designs and sizes, wherein each sprinkler application depth profile specifies a predetermined predicted delivered precipitation depth per unit distance along a diameter of a precipitation coverage pattern associated with a particular sprinkler and nozzle size;

setting a required irrigation delivery rate/depth for at least a portion of one segment of a distribution boom/line;

selecting a lateral position for a first sprinkler location along the distribution boom/line relative to an irrigation source end of the distribution line based upon said required irrigation delivery rate/depth and an application depth profile associated with said first sprinkler; and determining a lateral position and a nozzle size for at least a second or more sprinklers added at adjacent locations along the distribution line relative to said first or a previous sprinkler position by iteratively adjusting both a nozzle size of each added sprinkler and a lateral separation between an added sprinkler and a previous sprinkler, until an accumulated sum of individual sprinkler application depth profiles is within a predetermined tolerance range of the required irrigation delivery rate/depth for a corresponding distribution boom/line segment.

6. A computer system for determining optimized lateral positions and nozzle sizes for sprinklers in center pivot and/or linear moving irrigation systems, comprising:

first sprinkler nozzle size optimizing programmable logic circuitry configured to iteratively compute a delivered precipitation depth profile and a delivered precipitation depth error along a first lateral portion of the distribution boom/line segment and an optimized sprinkler nozzle size for a first sprinkler located at a user-selected first lateral position based on a specified required precipitation delivery rate/depth information, sprinkler precipitation application depth profiles and a computed delivered depth error for said first sprinkler, wherein a sprinkler nozzle size parameter is varied during successive iterations until the computed delivered precipitation depth error is within a predetermined range of error tolerance associated with said required precipitation delivery rate/depth for said first lateral portion of the distribution boom/line segment; and second and subsequent adjacent sprinkler position and nozzle size optimizing programmable logic circuitry configured to iteratively compute a total accumulated delivered precipitation depth profile and a total accumulated precipitation depth error for said first and a second portion of the distribution boom/line segment and an optimized sprinkler nozzle size and lateral position for at least a second or more sprinklers added at adjacent lateral positions along said distribution boom/line based upon a computed summation of said first sprinkler delivered precipitation depth profile with one or more sprinkler delivered precipitation depth profiles corresponding to said second or more subsequently added sprinklers, wherein parameters for sprinkler nozzle size and lateral position for each of said second or more subsequently added sprinklers are varied during successive iterations until the computed total accumulated precipitation depth error is within a predetermined range of error tolerance associated with a required precipitation delivery rate/depth for said first and second portions of the distribution boom/line segment.

7. An article of manufacture, comprising a non-transitory computer readable information storage medium having computer executable program code encoded therein for configuring a computer to compute and output information specifying optimized lateral positions of sprinkler heads and sprinkler nozzle size for use in center pivot and/or linear moving irrigation systems, comprising:

code for acquiring data specifying an application/precipitation depth required along one or more lateral segments/portions of an irrigation distribution boom/line, data specifying a range of error tolerance associated with the required application/precipitation depth for the lateral segments/portions, and data specifying sprinkler precipitation application depth profiles which specify individual precipitation coverage patterns associated with different combinations of sprinkler head/nozzle designs and sizes, said data acquired from a local system/device memory or from a remote database;

code for setting an initial nozzle size and initial lateral position of a first sprinkler along the distribution boom/line and for iteratively computing a predicted application/precipitation delivery depth profile and a delivered precipitation depth error value for a first lateral portion of the distribution boom/line and an optimized sprinkler nozzle size for a first sprinkler located at the initial lateral position based on the required application/precipitation depth data, the sprinkler precipitation application depth profiles and a computed delivered precipitation depth error for the first sprinkler, wherein a sprinkler nozzle size parameter is increased or decreased during successive iterations until the computed delivered precipitation depth error is within the range of error tolerance associated with the required precipitation delivery rate/depth for the first lateral portion of the distribution boom/line; and code for determining optimal positions and nozzle sizes for one or more adjacent sprinklers to the first sprinkler along the distribution boom/line by iteratively computing a total accumulated delivered precipitation depth profile and a total accumulated precipitation depth error for the first lateral portion and a second lateral portion along the distribution boom/line and an optimized sprinkler nozzle size and lateral position for at least a second or more sprinklers provisionally included at adjacent lateral positions along said distribution boom/line, wherein an optimized sprinkler nozzle size and lateral position is determined based upon a computed sum of said first sprinkler predicted application/precipitation delivery depth profile and one or more sprinkler application/precipitation delivery depth profiles corresponding to second or more adjacently positioned sprinklers, and wherein parameters for sprinkler nozzle size and lateral position for the second or more adjacently added sprinklers are increased or decreased during successive iterations until the computed total accumulated precipitation depth error is within a predetermined range of error tolerance associated with the range of error tolerance associated with the required precipitation delivery rate/depth for said first and second portions of the distribution boom/line.

8. A non-transitory computer-readable medium embodying one or more sequences of one or more processing instructions which, when executed by a one or more processors, implement a method, performed by one or more computer controlled devices, for determining an optimal sprinkler position and sprinkler nozzle size for a plurality of sprinklers in an irrigation system, comprising computer-instructions implementing steps of:

iteratively computing a delivered precipitation depth profile and a delivered precipitation depth error along a first lateral portion of the distribution boom/line segment and an optimized sprinkler nozzle size for a first sprinkler located at a user-selected first lateral position based on specified required precipitation delivery rate/depth information, one or more specified sprinkler precipitation application depth profiles and a computed delivered precipitation depth error for said first sprinkler, wherein a sprinkler nozzle size parameter is varied during successive iterations until the computed delivered precipitation depth error is within a predetermined range of error tolerance associated with said required precipitation delivery rate/depth for said first lateral portion of the distribution boom/line segment;

iteratively computing a total accumulated delivered precipitation depth profile and a total accumulated precipitation depth error for said first and a second portion of the distribution boom/line segment and an optimized sprinkler nozzle size and lateral position for at least a second or more sprinklers subsequently added at adjacent lateral positions along said distribution boom/line based upon a computed summation of said first sprinkler delivered precipitation depth profile with one or more sprinkler delivered precipitation depth profiles corresponding to said second or more subsequently added sprinklers, wherein parameters for sprinkler nozzle size and lateral position for each of said second or more subsequently added sprinklers are varied during successive iterations until the computed total accumulated precipitation depth error is within a predetermined range of error tolerance associated with a required precipitation delivery rate/depth for said first and second portions of the distribution boom/line segment; and outputting information specifying said optimized nozzle size and lateral position for each sprinkler along a segment of the distribution boom/line.

9. A computer-readable medium as recited in claim 8, wherein a computed delivered depth error is determined by computing a sum of delivered precipitation depth over the same segment minus the required delivery depth over a segment.

10. A computer-readable medium as recited in claim 8, wherein a stored application depth profile specifies at least a delivery precipitation depth per unit distance along a diameter of a precipitation coverage pattern associated with a particular sprinkler and nozzle size.

11. A system, including one or more computer controlled devices, for determining and outputting information specifying optimal sprinkler position and sprinkler nozzle size for a plurality of sprinklers in an irrigation system, comprising:

a data storage device storing a specified required precipitation delivery rate/depth information corresponding to one or more discrete segments along an irrigation system distribution boom/line, said required precipitation delivery rate/depth having an associated range of rate/depth error tolerance for each segment of the irrigation system distribution boom/line;

a data storage device storing a plurality of sprinkler precipitation application depth profiles specifying individual precipitation coverage patterns associated with a plurality of different sprinkler head/nozzle designs and sizes;

a processor/computing device configured to compute an accumulated precipitation delivery depth produced by one or more sprinklers provisionally positioned along a segment of an irrigation system distribution boom/line based upon a summation of individual sprinkler precipitation depth profiles, each sprinkler precipitation depth profile associated with a particular sprinkler type and nozzle size, wherein the accumulated precipitation delivery depth is computed in an iterative manner in which sprinkler nozzle size and lateral position parameters for each said provisionally positioned sprinkler are varied during successive iterations until an accumulated precipitation delivery depth across each segment of the irrigation system distribution boom/line falls within a predetermined range of error tolerance of a required precipitation delivery rate/depth along the same segment, and said processor/computing device being further configured to output information indicative of optimized lateral position and nozzle size parameters corresponding to each sprinkler provisionally positioned along said segment of the irrigation system distribution boom/line, as determined by a computation for which an accumulated precipitation delivery depth is within the predetermined range of error tolerance over the length of each segment; and a user/client device having a display on which is displayed information specifying said optimized nozzle size and lateral position for each sprinkler along a segment of the distribution boom/line.

12. A system as recited in claim 11, wherein the user/client device also comprises a radio frequency ID receiver device.

13. A system as recited in claim 11, wherein the user/client device also comprises a barcode scanning device.

14. A system as recited in claim 11, wherein one or more of the data storage devices comprise one or more remote database storage devices coupled to a server or the Internet.

15. A system as recited in claim 11, wherein the processor/computing device comprises one or more servers coupled via the Internet or a local communications network.

16. A system as recited in claim 11, wherein one or more data storage devices, the user/client device, and the processor/computing device comprise a plurality of separate devices that communicate via the Internet or other suitable communications network.

17. A system as recited in claim 16, wherein the processor/computing device comprises a server computer connected to the Internet.

18. A system as recited in claim 16, wherein the user/client device is a portable device having a landline or a wireless connection to the Internet.

* * * * *